United States Patent
Caplow-Munro et al.

(10) Patent No.: US 12,553,466 B2
(45) Date of Patent: Feb. 17, 2026

(54) HINGED DEVICE WITH A FLEXIBLE DISPLAY

(71) Applicant: Microsoft Technology Licensing, LLC, Redmond, WA (US)

(72) Inventors: Devin Caplow-Munro, Seattle, WA (US); Daniel C. Park, Woodinville, WA (US); Brett Tomky, Seattle, WA (US); Denys V. Yaremenko, Carnation, WA (US); Insang Hwang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 18/212,853

(22) Filed: Jun. 22, 2023

(65) Prior Publication Data
US 2024/0426335 A1 Dec. 26, 2024

(51) Int. Cl.
*H05K 5/02* (2006.01)
*F16C 11/04* (2006.01)

(52) U.S. Cl.
CPC ............ *F16C 11/04* (2013.01); *H05K 5/0226* (2013.01)

(58) Field of Classification Search
CPC .... F16C 11/04; H05K 5/0226; H04M 1/0268; H04M 1/022; G06F 1/1616; G06F 1/1652; G06F 1/1681
See application file for complete search history.

(56) References Cited

U.S. PATENT DOCUMENTS

| | | | | |
|---|---|---|---|---|
| 10,890,951 B1 * | 1/2021 | Watamura | ............ | G06F 1/1681 |
| 11,003,217 B2 * | 5/2021 | Cha | ...................... | G06F 1/1681 |
| 2010/0043174 A1 | 2/2010 | Bestle et al. | | |
| 2010/0045541 A1 | 2/2010 | Aoki et al. | | |
| 2019/0208649 A1 | 7/2019 | Jeon et al. | | |
| 2020/0097051 A1 * | 3/2020 | Liu | ........................ | G06F 1/1652 |
| 2021/0011513 A1 * | 1/2021 | Watamura | ............ | G06F 1/1652 |
| 2021/0207648 A1 * | 7/2021 | Chen | ..................... | H04M 1/022 |

FOREIGN PATENT DOCUMENTS

| | | | |
|---|---|---|---|
| CN | 207560064 U | 6/2018 | |
| EP | 4123417 A1 | 1/2023 | |
| KR | 102492937 B1 | 1/2023 | |
| WO | WO-2022010137 A1 * | 1/2022 | ........... G06F 1/1616 |

OTHER PUBLICATIONS

Translation of WO-2022010137A1 (Year: 2022).*
International Search Report and Written Opinion received for PCT Application No. PCT/US2024/031513, Sep. 11, 2024, 17 pages.

* cited by examiner

Primary Examiner — Abhishek M Rathod
(74) Attorney, Agent, or Firm — Rainier Patents, P.S.

(57) ABSTRACT

The description relates to hinged devices. One example can include a flexible display extending over a major surface of a first portion across a hinge assembly and over a major surface of a second portion. The hinge assembly can include a pair of hinge sub-assemblies that include elongate slider links that extend along a length from proximal ends that are rotationally secured to the hinge assembly to distal ends that are slideably secured to the first portion. The hinge assembly can also include an auxiliary hinge sub-assembly interposed between the pair of hinge sub-assemblies and comprising a truncated elongate slider link that extends along a length that is less than the length of the elongate slider links and extends from a proximal end that is rotationally secured to the hinge assembly to the distal end that is slideably secured in the first portion.

20 Claims, 17 Drawing Sheets

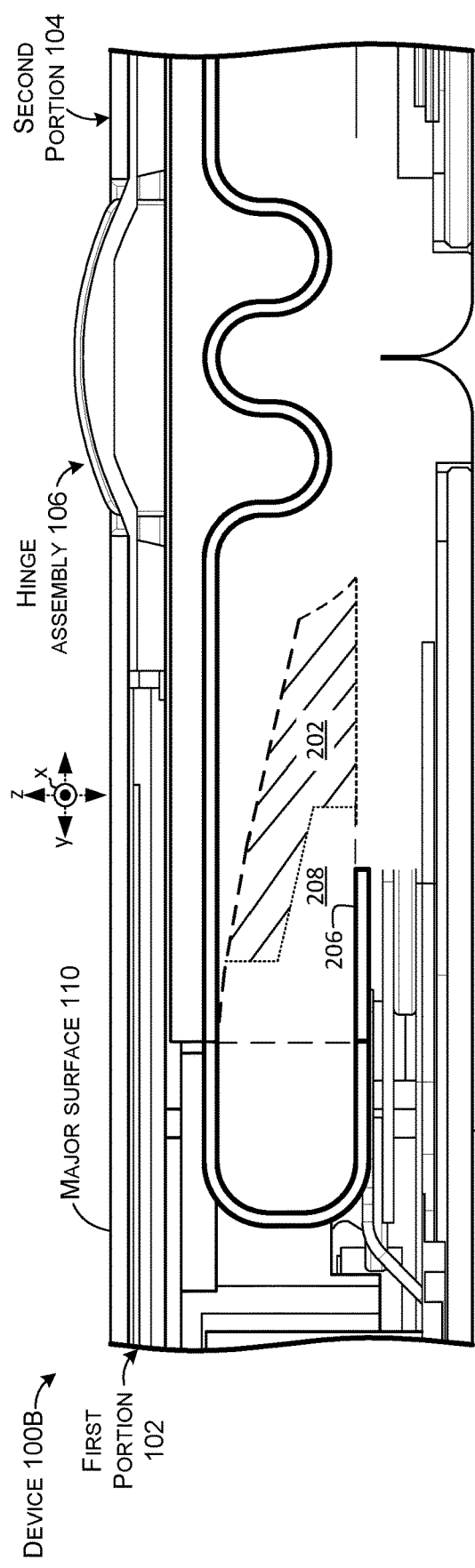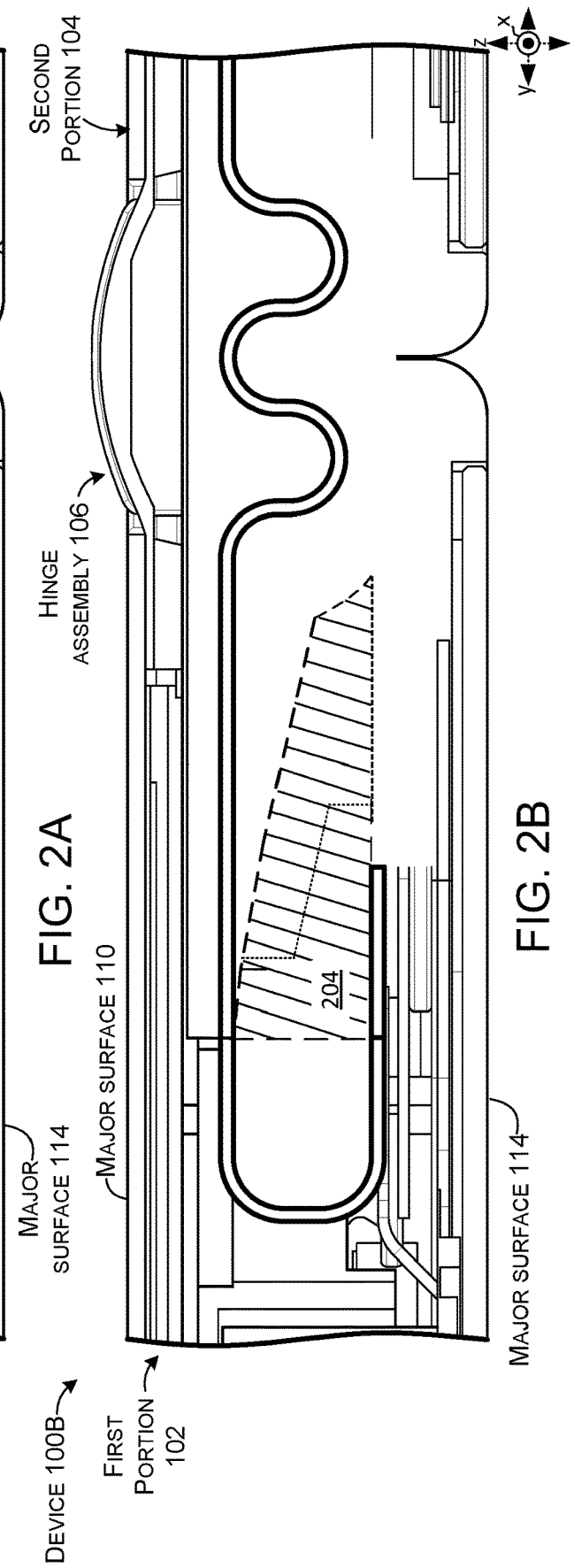

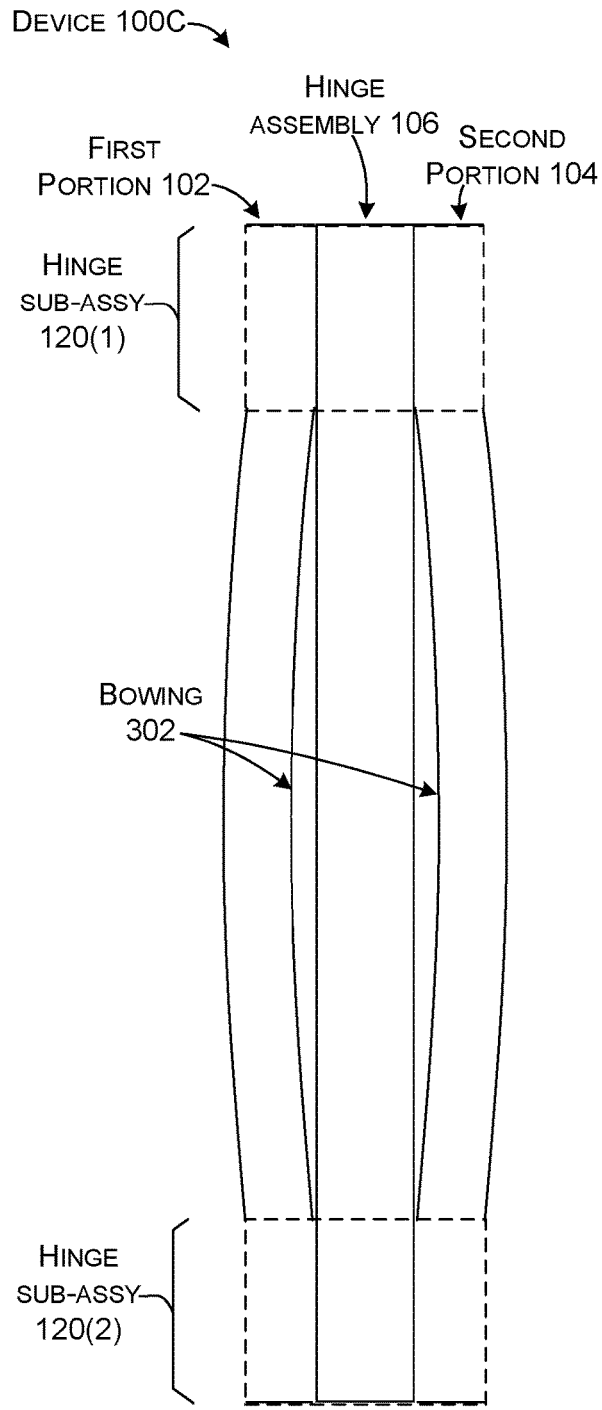
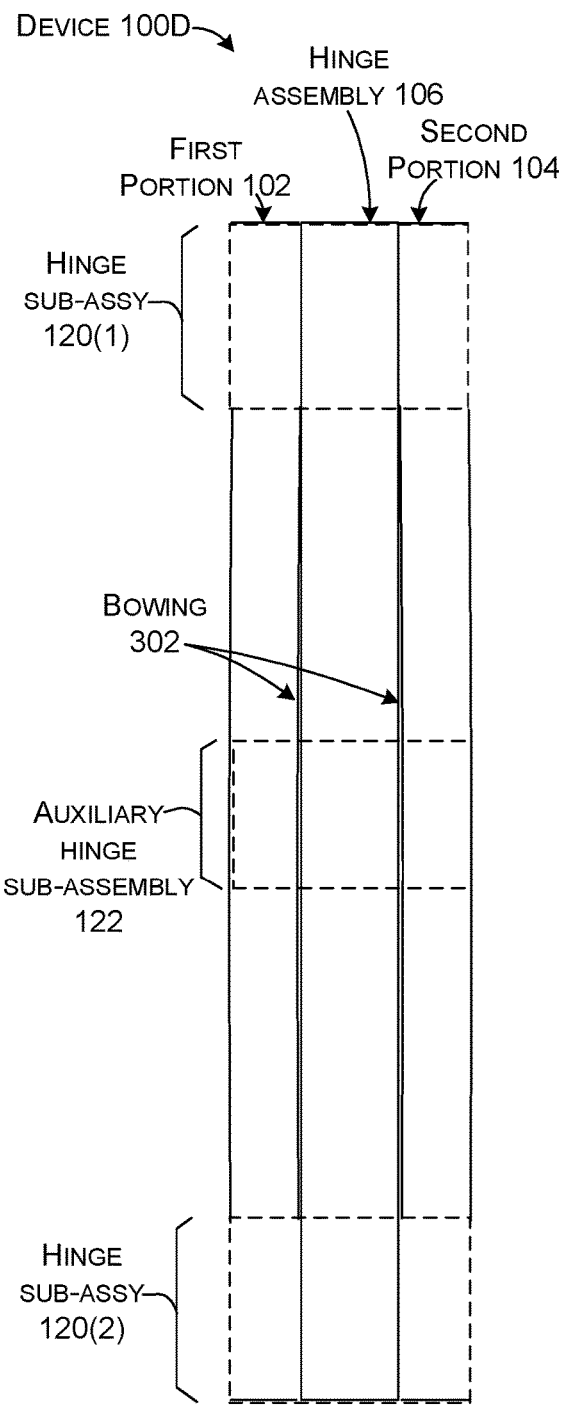
FIG. 3A
FIG. 3B

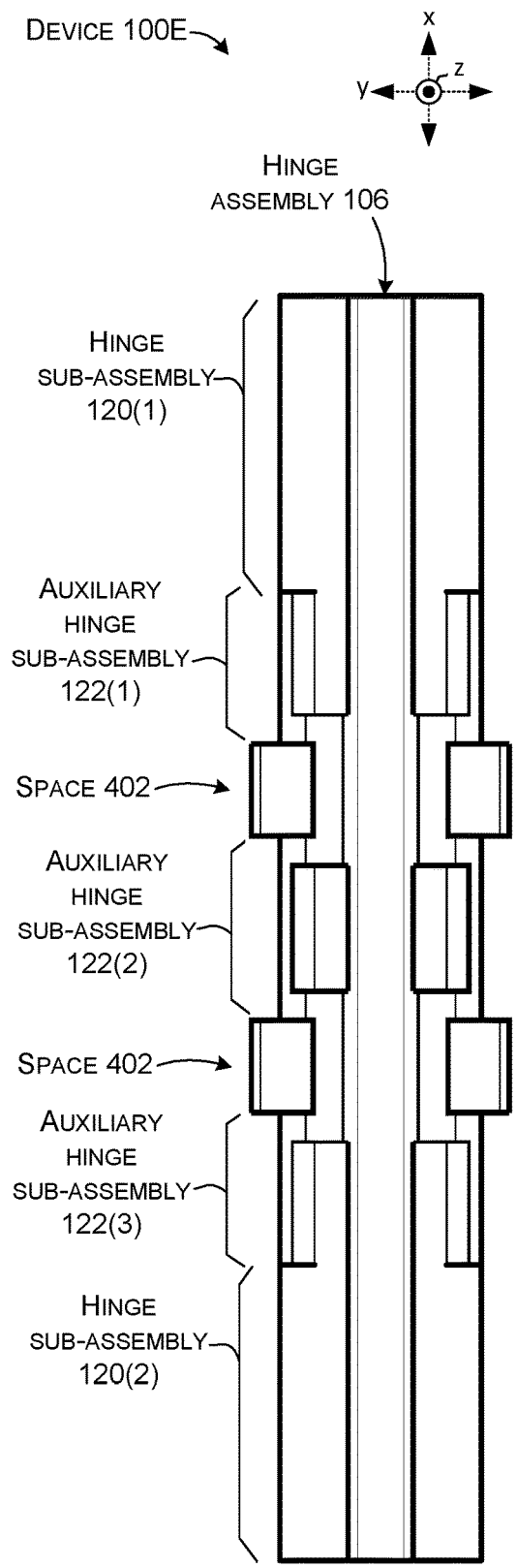
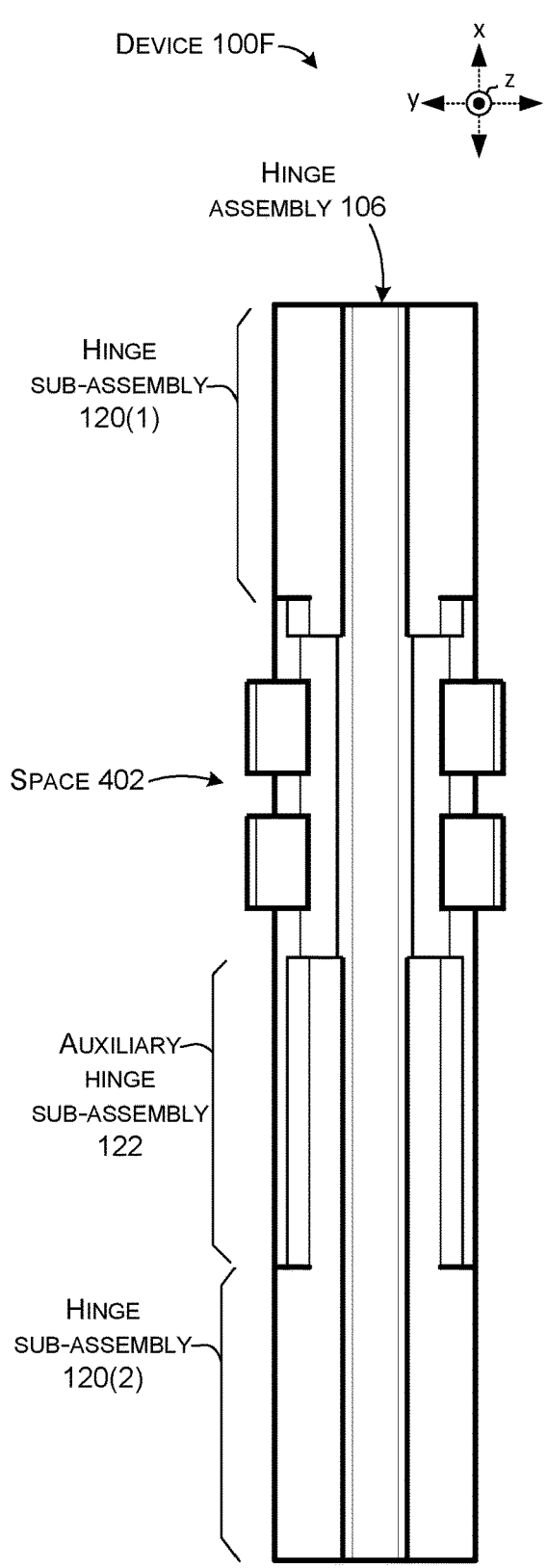
FIG. 4A
FIG. 4B

HINGED DEVICE WITH A FLEXIBLE DISPLAY

BACKGROUND

Flexible displays have been greatly anticipated for various applications, such as folding smart phone devices. However, adoption has been slow and initial products have experienced reliability issues.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown.

FIGS. 2A, 2B, 3A, 3B, 4A, 4B, 4C, 8, 9B, 10B, and 11B show elevational views of example devices in accordance with some implementations of the present concepts.

SUMMARY

This patent relates to hinged devices that have flexible displays. Consumers prefer compact devices, especially preferring thinner devices to thicker devices. As a result, many device components have to be positioned in a limited space. The present concepts provide a technical solution of a hinge assembly that occupies less device space than previous designs while satisfying hinge design parameters.

One example can include a hinge assembly securing a first portion and a second portion through a range of angular orientations. The example can include a flexible display extending over a major surface of the first portion across the hinge assembly and over a major surface of the second portion. The hinge assembly can include a pair of hinge sub-assemblies that include elongate slider links that extend along a length from proximal ends that are rotationally secured to the hinge assembly to distal ends that are slideably secured to the first portion. The hinge assembly can also include an auxiliary hinge sub-assembly interposed between the pair of hinge sub-assemblies and comprising a truncated elongate slider link that extends along a length that is less than the length of the elongate slider links and extends from a proximal end that is rotationally secured to the hinge assembly to the distal end that is slideably secured in the first portion.

This summary is provided for purposes of providing a brief explanation of some of the concepts described in this patent and is not intended as a complete or limiting description.

DESCRIPTION

The present concepts relate to devices, such as computing devices that include first and second device portions that are coupled at a hinge assembly through a range of (angular) rotation, such as from a closed zero-degree orientation to a fully open orientation, such as 180 degrees or more. A flexible display can span across the hinge assembly and be secured to both the first and second portions. The present concepts provide technical solutions that provide proper hinge function and display support while reducing device real-estate occupied by the hinge assembly.

Figure 1A:
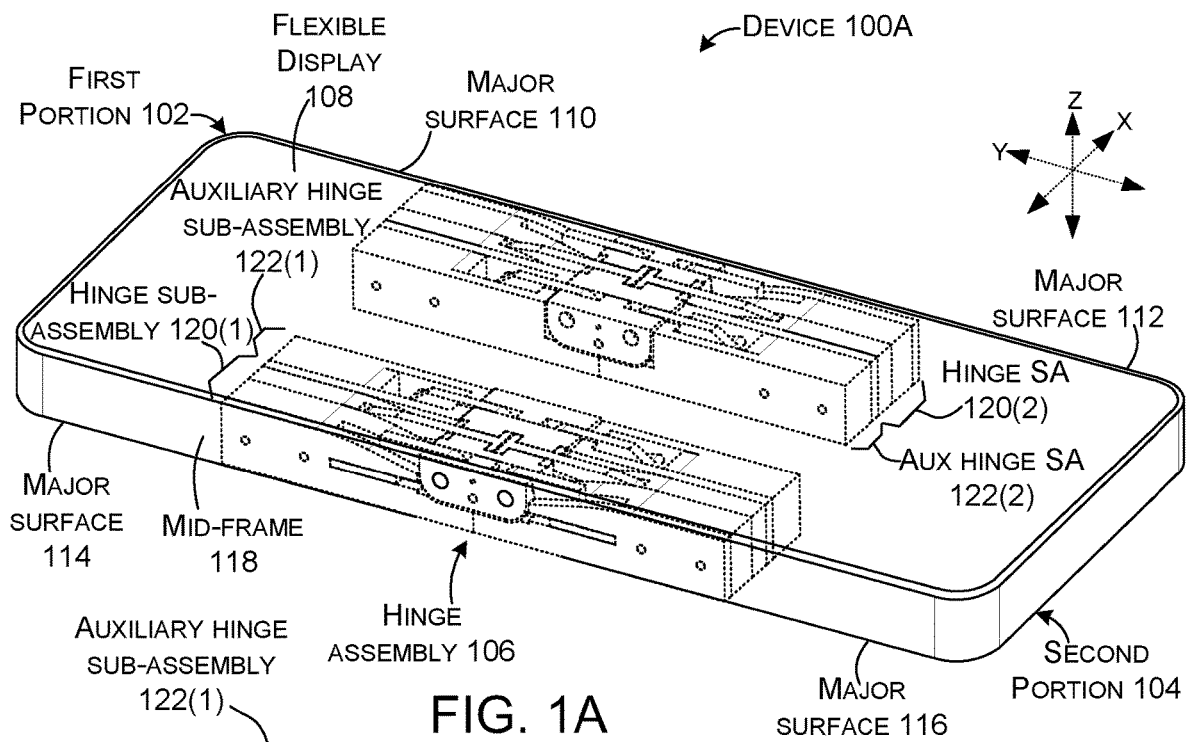
FIGS. 1A-1C, 5A, 5B, 6A, 7A, 9A, 10A, and 11A show perspective views of example devices in accordance with some implementations of the present concepts.
Figure 1B:
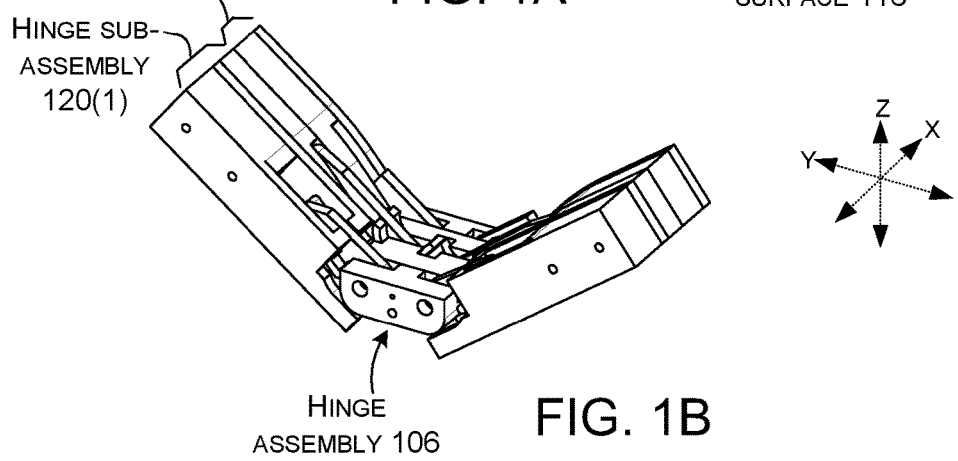
Figure 1C:
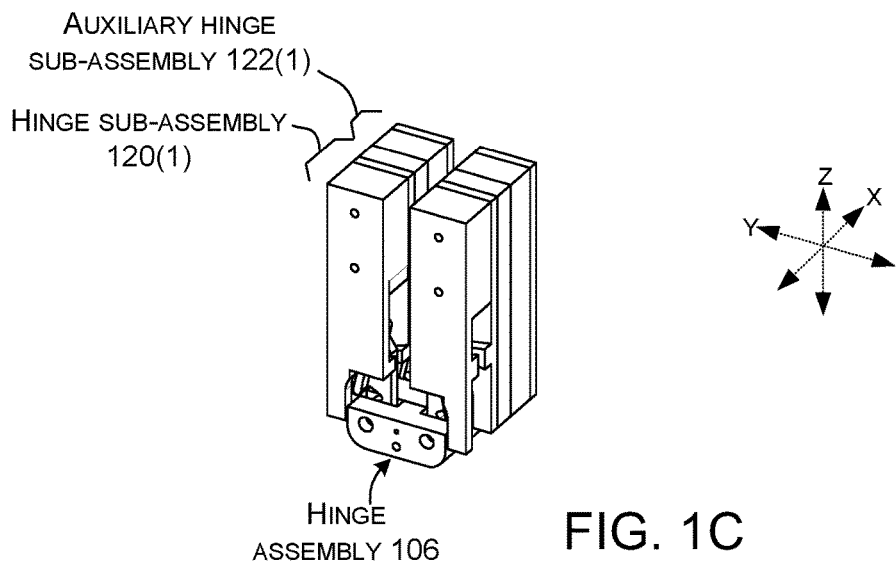

Introductory FIGS. 1A-1C collectively show an example device 100A that has first and second portions 102 and 104 that are rotatably secured together by a hinge assembly 106. FIG. 1A shows the first and second portions and the hinge assembly at a 180-degree orientation. In this implementation, 180 degrees is a fully open orientation. The hinge assembly 106 is shown in ghost in FIG. 1A to indicate that it would not normally be visible because it is obstructed by other components. FIGS. 1B and 1C show a portion of the hinge assembly in isolation at 90 degree and zero-degree orientations, respectively. A flexible display 108 is positioned on a first or upper major surface 110 of the first portion 102 across the hinge assembly 106 and on a first or upper major surface 112 of the second portion 104. The hinge assembly 106 is positioned between the first major surface 110 and a second or lower major surface 114 of the first portion 102 and between major surface 112 and a second major surface 116 of the second portion 104. The hinge assembly 106 can be secured in a thickness between the upper and lower major surfaces, such as to a chassis or mid-frame 118 of the first and second portions.

The hinge assembly 106 secures the first and second portions 102 and 104 and allows the first and second portions to rotate around rotational axes or hinge trajectories that are substantially parallel to the x reference axis. In this case, the hinge assembly comprises a pair of hinge sub-assemblies 120(1) and 120(2) that are positioned on opposing edges of the device 100A along the x reference axis. The hinge assembly 106 can also include an auxiliary hinge assembly 122 interposed between the pair of hinge sub-assemblies 120(1) and 120(2). In this case, two auxiliary hinge sub-assemblies 122 are employed. Note also that for purposes of illustration, the auxiliary hinge sub-assemblies 122 are positioned next to the hinge sub-assemblies 120. Other configurations where the auxiliary hinge sub-assemblies 122 are spaced away from the hinge sub-assemblies 120 are illustrated and described relative to FIGS. 4A-4C.

The pair of first and second hinge sub-assemblies 120(1) and 120(2) are positioned at opposing ends of the first and second portions 102 and 104 to rotationally secure the hinge ends of the first and second portions through the range of orientations. The pair of first and second hinge sub-assemblies 120(1) and 120(2) provide resistance to rotation (e.g., rotational torque) to hold the first and second portions at a given orientation. For instance, if a user orients the first and second portions at the 180-degree orientation of FIG. 1A, the 90-degree orientation of FIG. 1B, or the zero-degree orientation of FIG. 1C, the friction provided by the pair of first and second hinge sub-assemblies 120(1) and 120(2) will maintain the orientation until the user changes it. While the hinge sub-assemblies 120 perform valuable hinge functions, they also occupy a lot of space on the device. The auxiliary hinge sub-assemblies 122 interposed between the hinge sub-assemblies can augment the hinge function provided by the hinge sub-assemblies while occupying less space. The auxiliary hinge sub-assemblies 122 can augment the hinge function by reducing deformation of the hinge ends of the first and second portion between the first and second hinge sub-assemblies when the first and second portions are rotated to the closed orientation. These aspects are described below relative to FIGS. 2A-4C.

FIGS. 2A and 2B collectively show another device 100B. These FIGS. show space requirements for example auxiliary hinge sub-assemblies and hinge sub-assemblies in the hinge assembly 106 and the first and second portions 102 and 104, such as between major surfaces 110 and 114. FIGS. 2A and 2B are elevational views looking down the x reference axis or along the rotational/hinge axis.

FIG. 2A shows the space requirements (e.g., keep out area) 202 for example auxiliary hinge sub-assembly 122 of FIG. 1A. FIG. 2B shows the space requirements (e.g., keep out area) 204 for example hinge sub-assembly 120 of FIG. 1A. Note that the space requirements 204 include all of the space requirements 202 of the auxiliary hinge sub-assembly and additional space. As shown, the space requirements 204 for a hinge sub-assembly 120 are substantially larger than the space requirements 202 for the auxiliary hinge sub-assembly 122. Further, the shape of the space requirement 202 angles away from a mounting surface 206 and leaves a substantial portion of this surface and associated volume 208 available for mounting other components, such as electronic components, compared to the space requirements 204 of the hinge sub-assembly. Thus, the auxiliary hinge sub-assembly provides a technical solution in that it uses less total space or volume than the hinge sub-assembly, but the auxiliary hinge sub-assembly also uses less mounting area that can then be used for other purposes (e.g., to mount other components). The discussion relative to FIGS. 2A and 2B explains space savings associated with employing auxiliary hinge sub-assemblies to complement the hinge sub-assemblies. The description now turns to functionality provided by the auxiliary hinge sub-assemblies.

FIGS. 3A and 3B collectively show examples of functionality offered by employing auxiliary hinge sub-assemblies. FIGS. 3A and 3B show devices 100C and 100D, respectively in the closed position with the first and second portions 102 and 104 extending away from the reader into the page. FIG. 3A shows a device configuration with a pair of hinge sub-assemblies 120(1) and 120(2) at opposing ends of the hinge assembly 106. In this closed orientation, forces acting in the y reference direction on the first and second portions cause bowing 302 of the first and second portions between the hinge sub-assemblies 120. The term 'bowing' means unintended deviation from a designed linear configuration to a curvilinear configuration. The flexible display (108 FIG. 1A) has a resistance to folding and is a source of forces at the closed orientation that contribute to the bowing 302.

FIG. 3B shows device 100D which includes auxiliary hinge sub-assembly 122 interposed between the pair of hinge sub-assemblies 120(1) and 120(2). The auxiliary hinge sub-assembly 122 augments the hinge function provided by the hinge assembly 106. One way the auxiliary hinge sub-assembly 122 augments the hinge function is by resisting the y direction forces (e.g., bulging forces) experienced between the first and second portions 102 and 104 and the hinge assembly 106. This is evidenced by comparing the extent of bowing 302 in FIG. 3B (e.g., little or none) to the extent of bowing 302 in FIG. 3A (e.g., extensive). Another way the auxiliary hinge sub-assembly 122 augments the hinge function is by resisting rotation in one direction (e.g., closing). As a result, the auxiliary hinge sub-assembly 122 provides a technical solution of enhancing hinge function (e.g., causing the hinge assembly to maintain a designed configuration) while occupying less device space (e.g., real-estate) than would be required to add another hinge sub-assembly. Three additional example auxiliary hinge sub-assembly arrangements are discussed below relative to FIGS. 4A-4C.

The combination of auxiliary hinge sub-assembly(s) 122 and the hinge sub-assembly(s) 120 provides a technical solution of better hinge assembly performance than can be achieved with hinge sub-assemblies alone and maintains more available device real-estate than adding more hinge sub-assemblies. Hinge sub-assemblies 120 can provide resistance to rotation in both directions (e.g., open to closing and closing to opening). The hinge sub-assemblies can resist bulging, provide synchronization or timing, and/or detent functions. Synchronization ensures that rotation of either of the first portion or second portion relative to the hinge assembly occurs with equal (and opposite) rotation of the other of the first and second portions relative to the hinge assembly. However, hinge sub-assemblies occupy a large amount of device real-estate. Auxiliary hinge sub-assembly(s) 122 can resist rotation in one direction (e.g., when closing, but not when opening), can resist bulging, and/or can provide a detent when the device is in or approaches fully open. The auxiliary hinge sub-assembly(s) 122 can provide this augmentation while occupying less device real-estate than adding more hinge sub-assemblies 120.

Figure 4C:
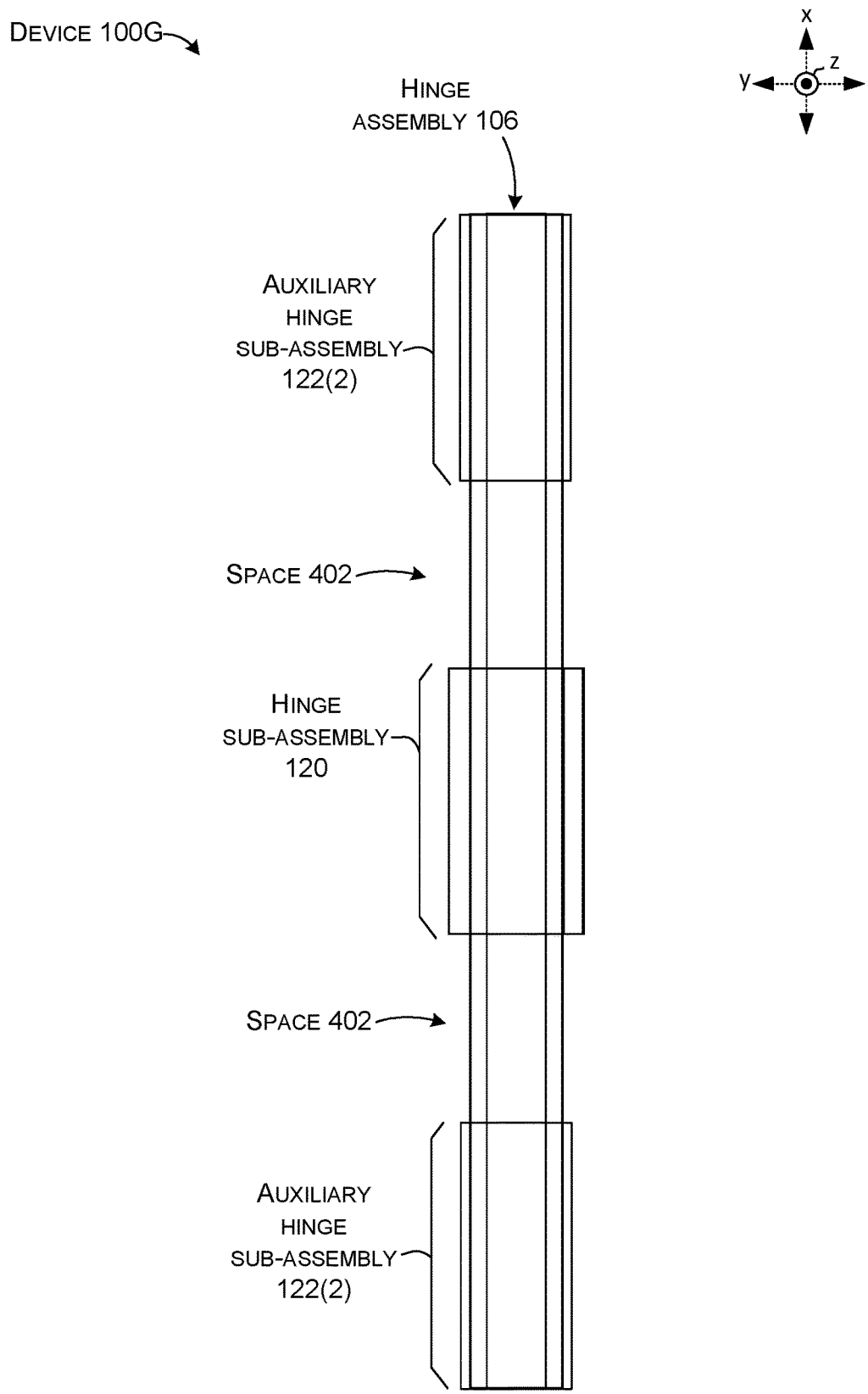
Figure 5A:
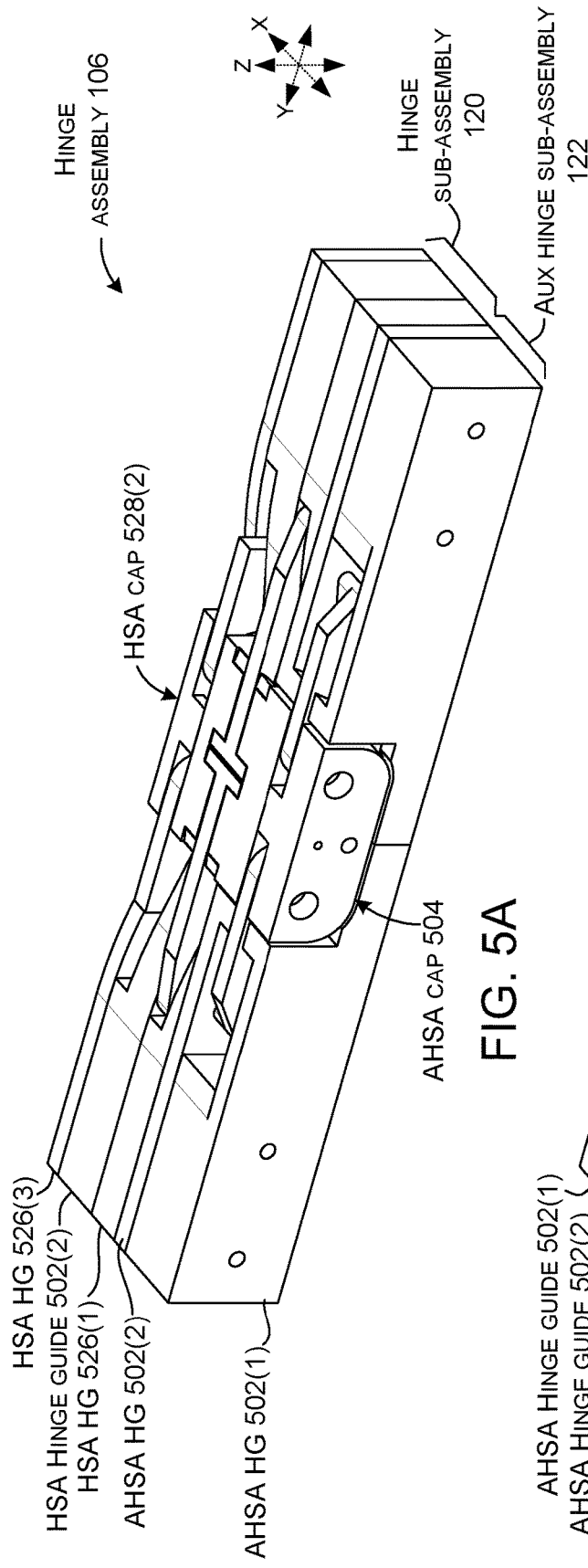
Figure 5B:
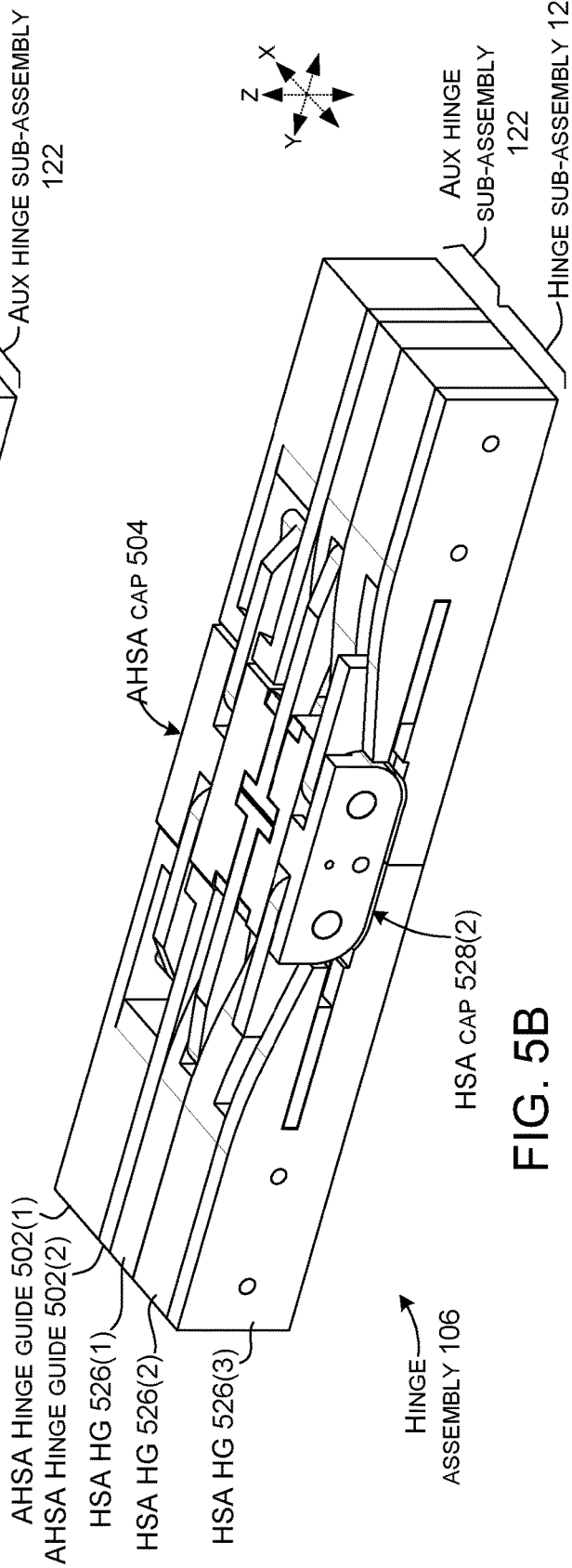
Figure 5C:
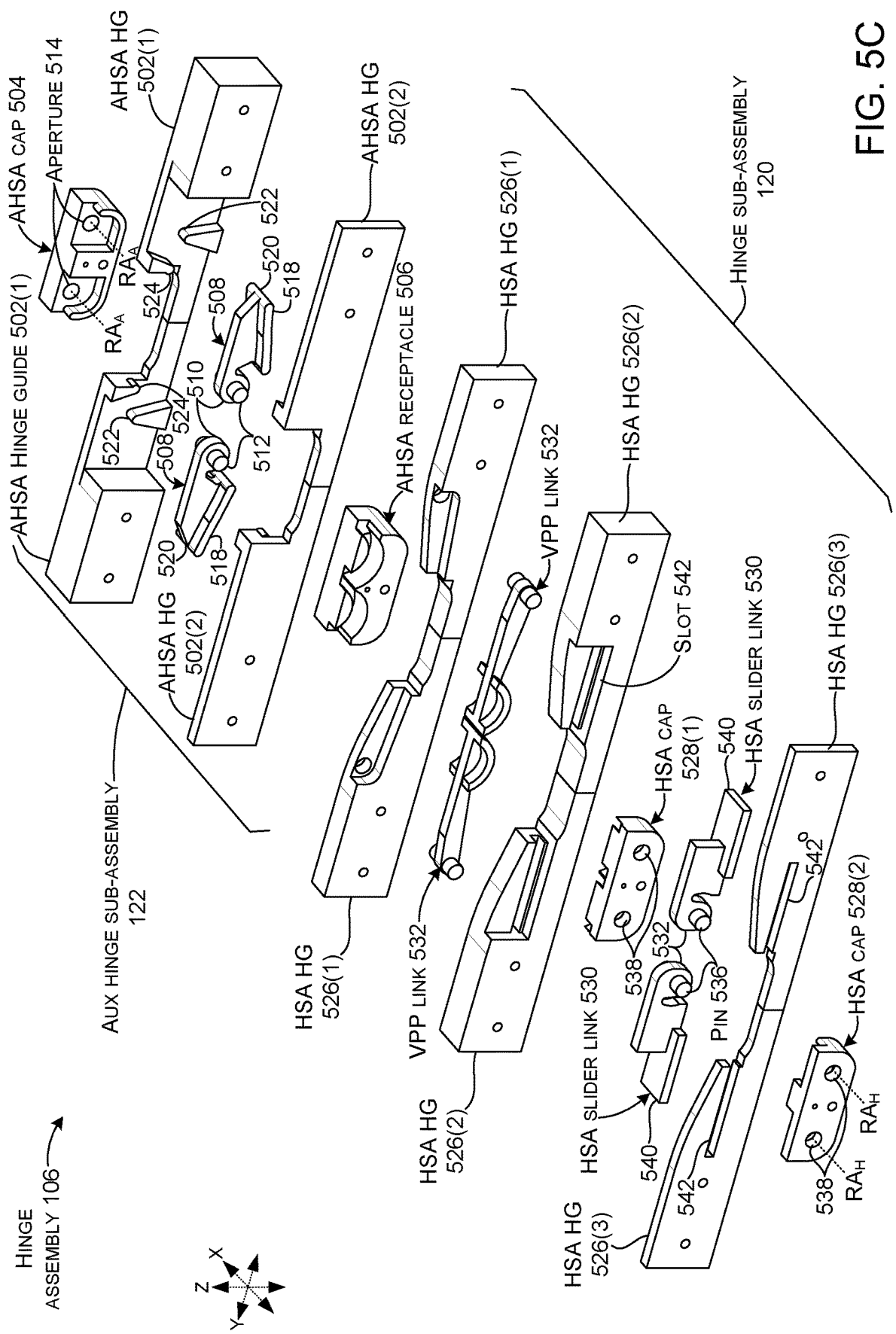
FIGS. 5C, 5D, 6B, and 7B show exploded perspective views of example devices in accordance with some implementations of the present concepts.
Figure 5D:
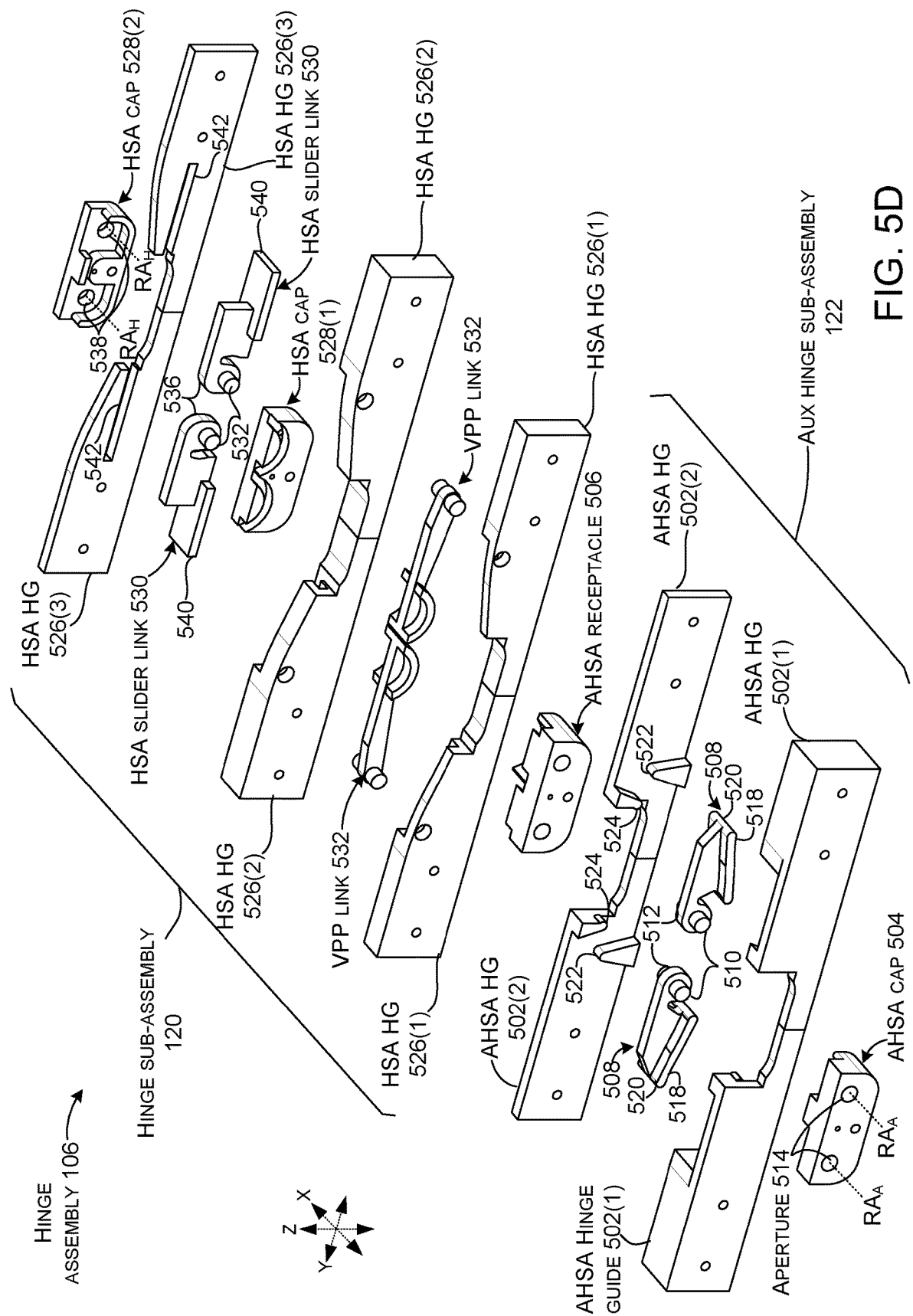
Figure 6A:
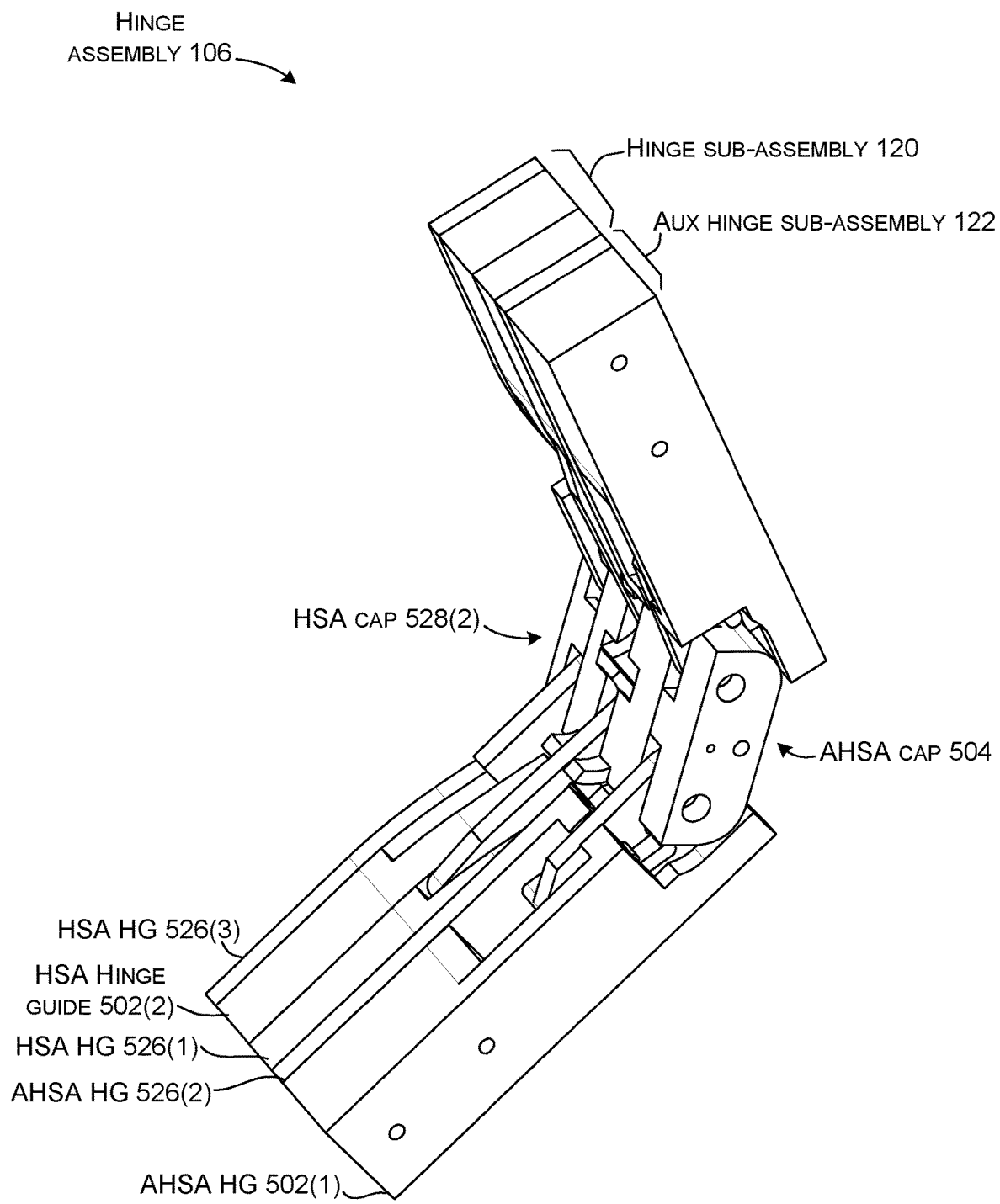
Figure 6B:
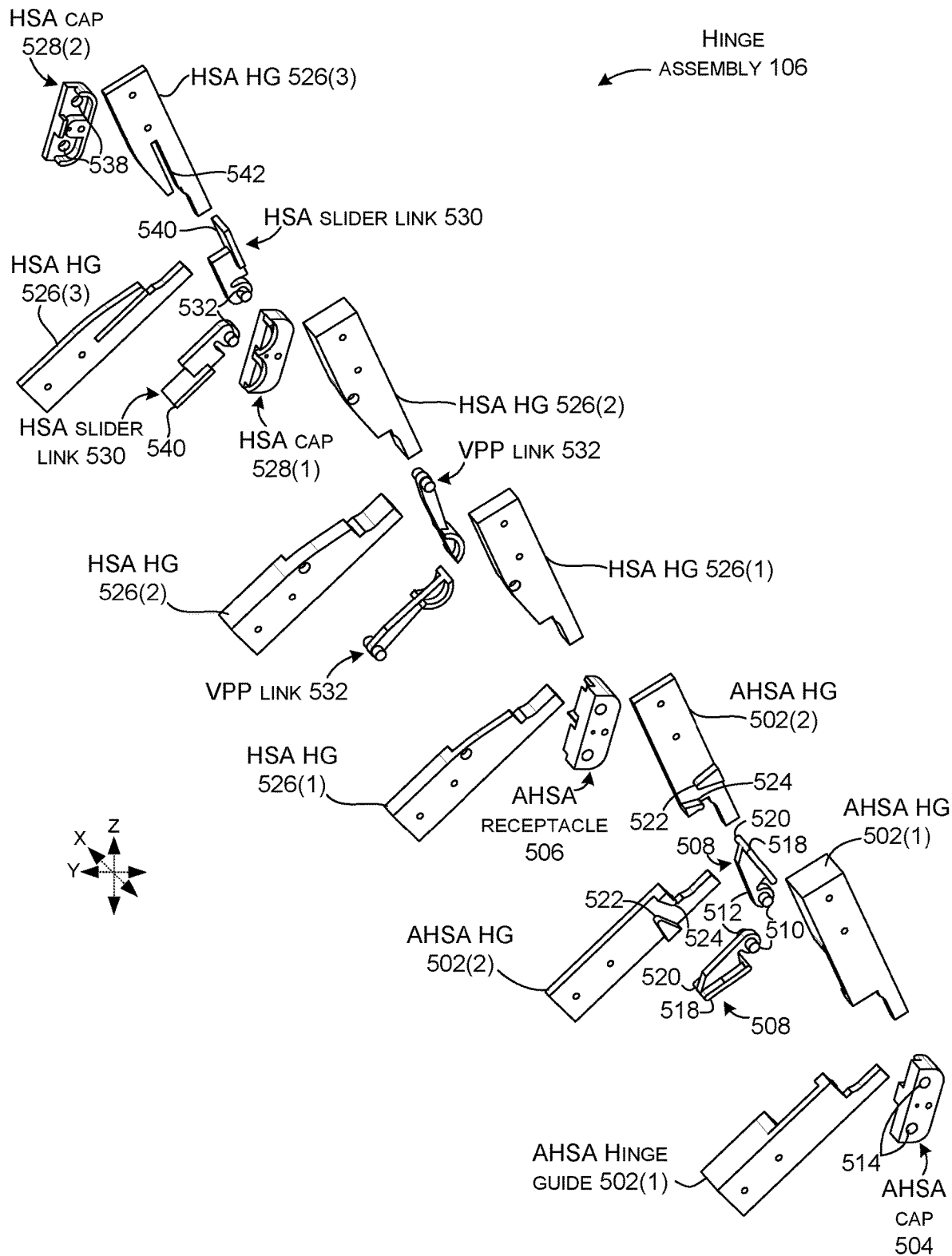
Figure 7A:
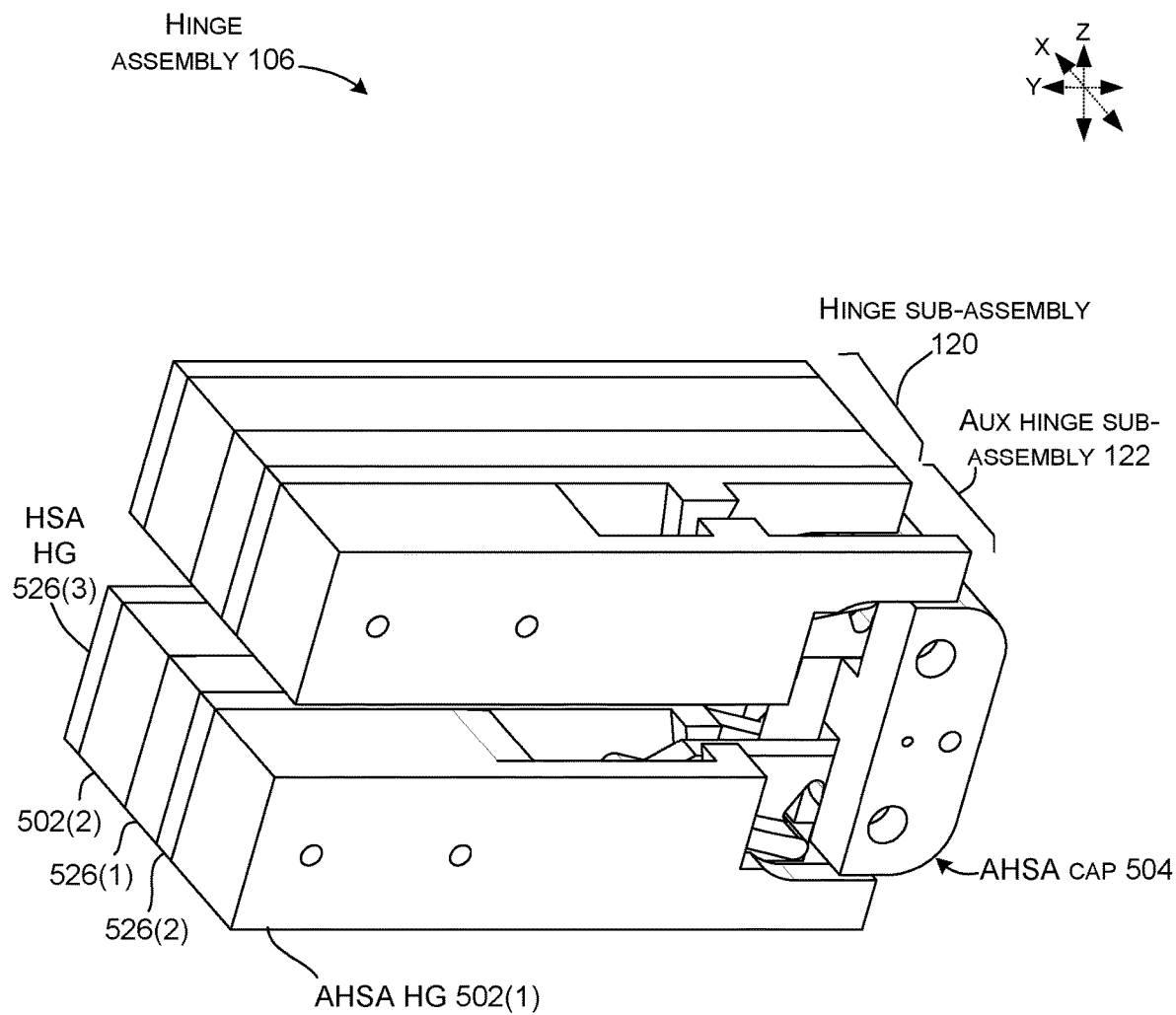
Figure 7B:
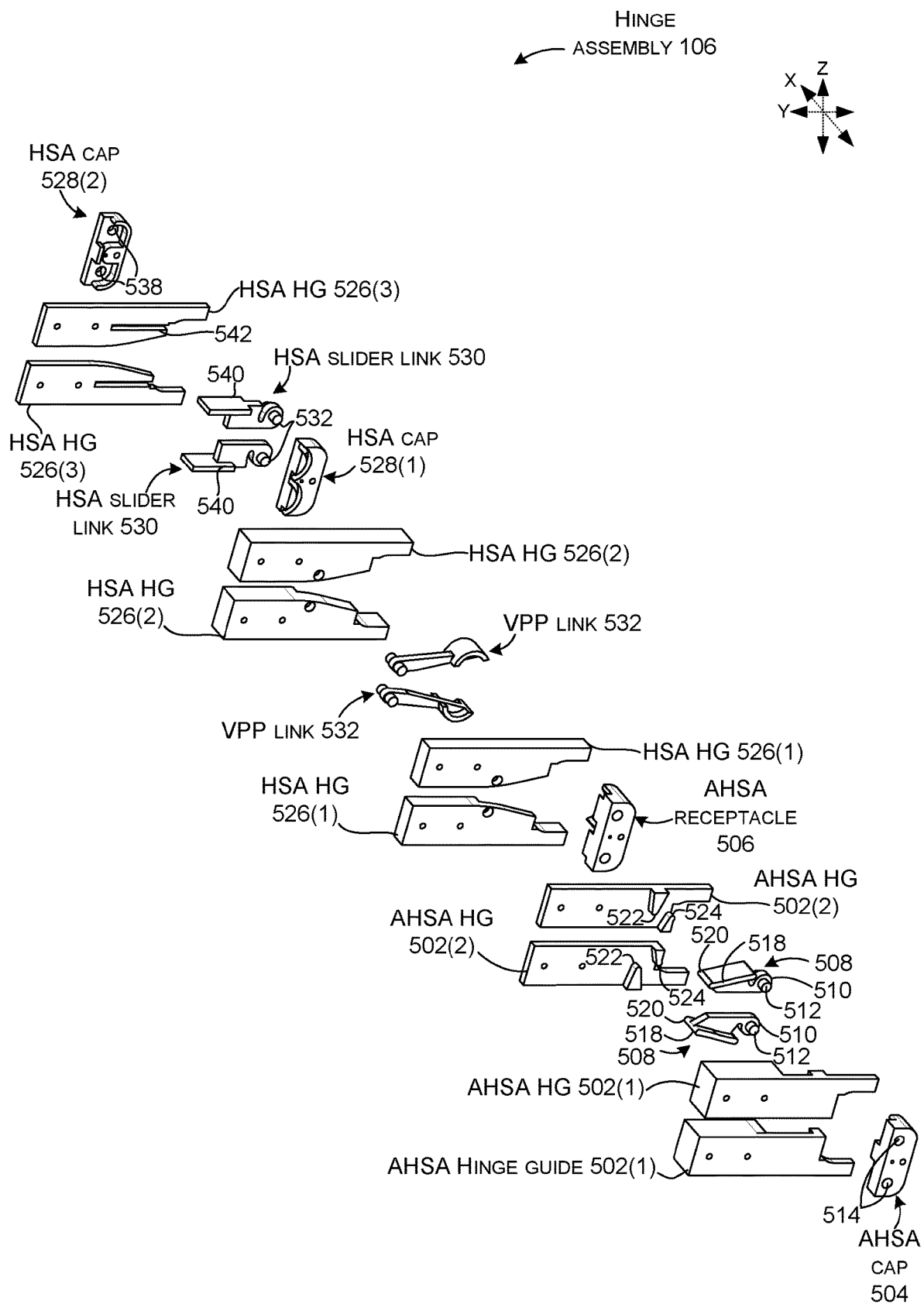

FIGS. 4A-4C show three additional example devices 100E, 100F, and 100G, respectively. FIG. 4A shows example hinge assembly 106 with three auxiliary hinge sub-assemblies 122(1)-122(3) interposed between the hinge sub-assemblies 120(1) and 120(2). In this case, the three auxiliary hinge sub-assemblies 122(1)-122(3) are spaced apart from one another so that intervening spaces 402 are available for routing conductors (not shown in this FIG.) through the hinge assembly 106. Conductors are shown, but not specifically designated in FIGS. 2A and 2B.

FIG. 4B shows another example device 100F that includes hinge assembly 106. In this implementation, hinge assembly 106 has a single auxiliary hinge sub-assembly 122 that is offset (e.g., not centered between the hinge sub-assemblies 120). Intervening space 402 is available for routing conductors.

FIG. 4C shows another example device 100G that includes hinge assembly 106 with a single centrally positioned hinge sub-assembly 120 and auxiliary hinge sub-assemblies 122(1) and 122(2) positioned toward the edges of the device. Intervening spaces 402 are available for routing conductors. In this case, the hinge sub-assembly 120 can provide the primary hinge functionality, such as timing and resistance to rotation. The auxiliary hinge sub-assemblies 122(1) and 122(2) can augment this functionality, such as by providing stability and reducing bulging.

The configurations shown in FIGS. 4A-4C enhance the function of the hinge assembly 106 while utilizing less space than employing additional hinge sub-assemblies and allowing space for conductors to pass through the hinge assembly.

FIGS. 5A-5D, 6A, 6B, 7A, and 7B collectively show details of an example hinge sub-assembly 120 and an example auxiliary hinge sub-assembly 122. For purposes of explanation, the hinge sub-assembly 120 is positioned proximate to the auxiliary hinge sub-assembly 122. However, as explained above, relative to FIGS. 3B, 4A, 4B, and 4C, the hinge sub-assembly 120 and the auxiliary hinge sub-assembly 122 can be spaced apart from one another in the hinge assembly along the x reference axis.

In this implementation, the auxiliary hinge sub-assembly 122 includes auxiliary hinge sub-assembly (AHSA) hinge guides 502(1) and 502(2). The auxiliary hinge sub-assembly 122 also includes an AHSA cap 504, AHSA receptacle 506, and truncated elongate slider link 508. Proximal ends 510 of the truncated elongate slider link 508 define pins 512 that are received in apertures 514 in the AHSA cap 504 and apertures 516 in the AHSA receptacle 506. Pads 518 extend toward the distal ends 520 and contact upwardly and downwardly facing contact surfaces 522 and 524 on the AHSA hinge guides 502. Thus, the truncated elongate slider link 508 is elongate along a long axis between the proximate ends 510 and the distal ends 520.

In this implementation, a portion of the truncated elongate slider link 508 toward the distal ends 520 approximates an inverted 'T' shape when viewed transverse a long axis of the truncated elongate slider link 508. The pads 518 form the horizontal portion of the 'T' shape that is attached to a generally vertical portion. The pads 518 engage the upwardly and downwardly facing contact surfaces 522 and 524. Due to space constraints on the drawing pages, not all elements can be designated on each figure. However, at least one of each element is designated on at least one of FIGS. 5A-5D.

The hinge sub-assembly 120 includes hinge sub-assembly (HSA) hinge guides 526, HSA caps 528, HSA slider links 530, and virtual pivot point (VPP) links 532. Proximal ends of VPP links 532 are secured between AHSA receptacle 506 and HSA cap 528(1). Distal ends of VPP links 532 are secured in apertures in HSA hinge guides 526(1) and 526(2). In relation to the virtual pivot point links, 'virtual' refers to the fact that the rotation axis of this link is in the hinge assembly (e.g., spine) and is constrained with a semi-circle and not a full round shaft. Proximal ends 532 of HSA slider links 530 include pins 536 that are secured in apertures 538 of HSA caps 528. Distal ends 540 of HSA slider links 530 are secured in slots 542 in HSA hinge guides 526(2) and 526(3). The HSA slider links 530 are elongate along a long axis between the proximate ends 532 and the distal ends 540.

The truncated elongate slider links 508 of the auxiliary hinge sub-assembly 122 are shorter in the y reference direction compared to the HSA slider links 530. This is conveyed by the use of the term 'truncated' relative to the truncated elongate slider links 508. This shorter length contributes at least some of the space savings associated with volume 208 described above relative to FIG. 2A. The orientation of the truncated elongate slider links 508 (e.g., neither parallel nor perpendicular to the major surfaces) also contributes to the volume 208.

Note that the pins 512 and apertures 514 define the rotational axes ($RA_A$) of the truncated elongate slider links 508. Similarly, pins 536 and apertures 538 define the rotational axes ($RA_H$) of the elongate slider links 530. The rotational axes ($RA_A$) of the truncated elongate slider links 508 are substantially parallel to, but not coextensive with, the rotational axes ($RA_H$) of the elongate slider links 530. (The term 'substantially' is intended to cover design tolerances, such as +/− three degrees, for example). Thus, the rotation of truncated elongate slider links 508 around their proximate ends 510 is eccentric to the rotation of HSA elongate slider links 530 around their proximate ends 532. However, the present concepts include a technical solution so that this configuration does not cause binding of the hinge assembly during rotation. The technical solution involves the distal ends 520 of the truncated elongate slider links 508 and the distal ends 540 of slider links 530 having different paths and orientations during the range of rotation. The truncated elongate slider links 508 are oriented at an acute angle in the auxiliary hinge sub-assembly 122 relative to the major surfaces. Stated another way, a majority of the elongate slider links 508 are neither parallel nor perpendicular to the major surfaces. This acute angle is visible in FIGS. 5C and 5D and is specifically labeled in FIG. 9A.

A majority of slider link 530 is oriented parallel to the major surfaces and slides parallel to the major surfaces in slots 542. In contrast, the paths of distal ends 520 of the truncated elongate slider links 508 are defined by upwardly and downwardly facing contact surfaces 522 and 524 and the shape of the pads 518. This combination creates a non-linear path for the distal ends 520 during the range of rotation of the first and second portions. The paths of distal ends 540 of the slider links 530 is controlled by the slider links riding in slots 542 that define a linear path along which the slider links travel. The slots 542 are parallel to the major surfaces and the path of the distal ends 540 is both linear and parallel to the major surfaces. This combination allows the truncated elongate slider links 508 to rotate around different rotational axes than the slider links 530 without causing binding during rotation of the first and second portions.

Figure 8:
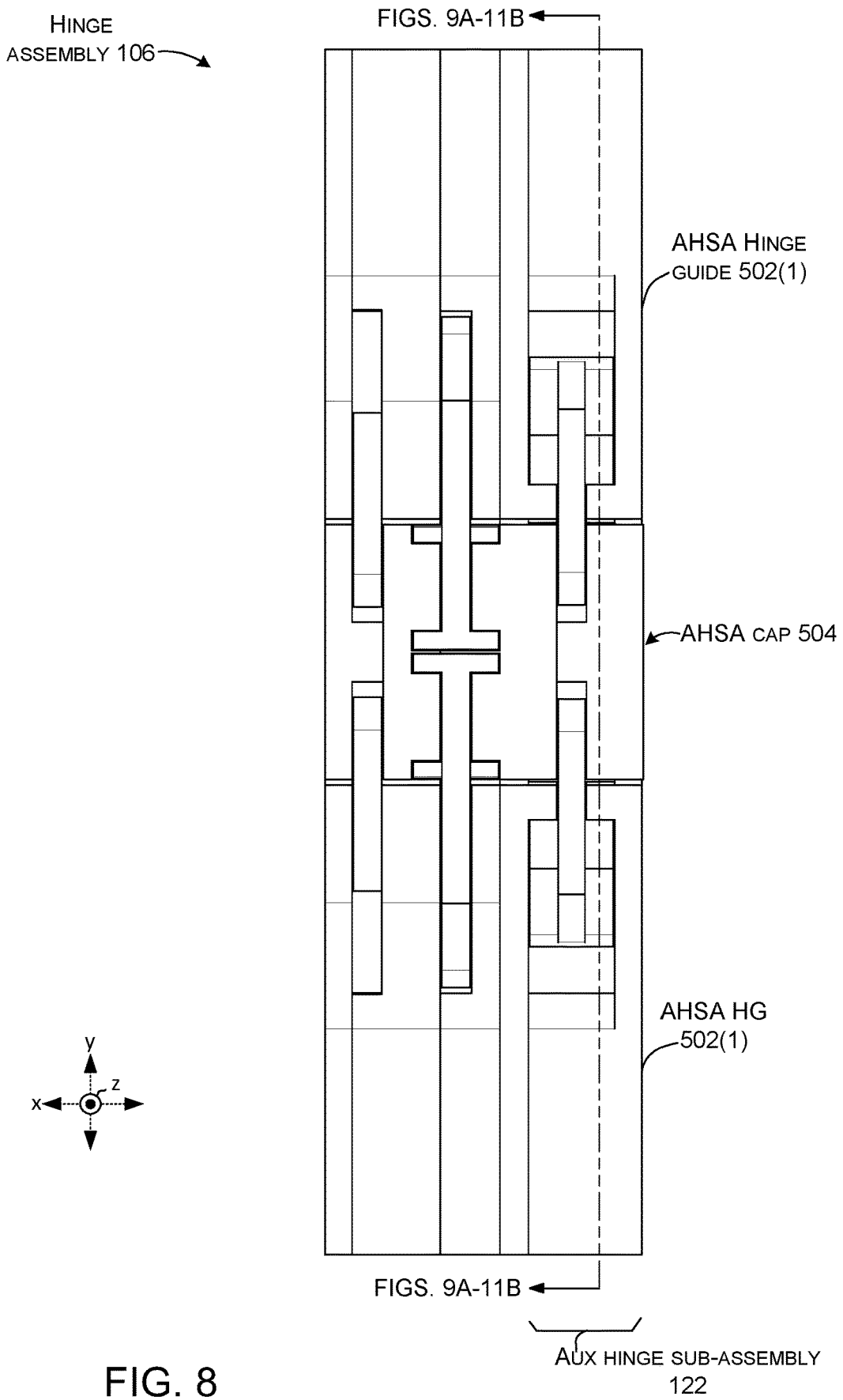

FIGS. 8-11B collectively show details of an example hinge assembly 106 that includes an example auxiliary hinge sub-assembly 122. FIG. 8 shows an elevational view of example hinge assembly 106. FIG. 8 indicates a sectional view taken through the auxiliary hinge sub-assembly 122. This sectional view is shown in FIGS. 9A and 9B at the 180-degree orientation, FIGS. 10A and 10B at the 90-degree orientation, and FIGS. 11A and 11B at the zero-degree (e.g., closed) orientation. In FIGS. 9A-11B generally one side of the auxiliary hinge sub-assembly 122 is labelled and the other side is unlabeled so that the features are visible without the clutter of designators and lead lines. Also, the components labelled in FIGS. 8-11B are introduced above relative to FIGS. 1A-7B and are not reintroduced here for sake of brevity.

Figure 9A:
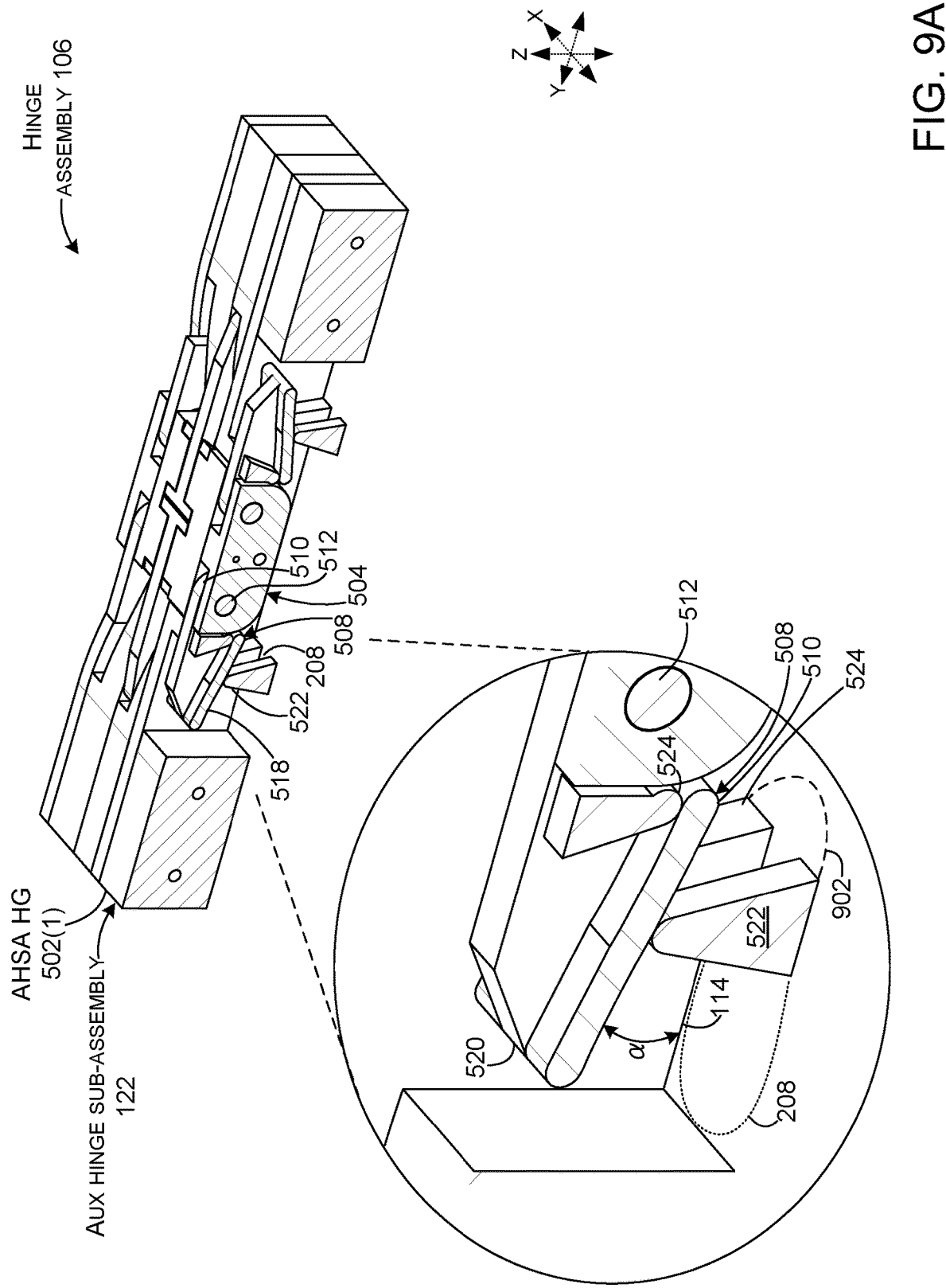
Figure 9B:
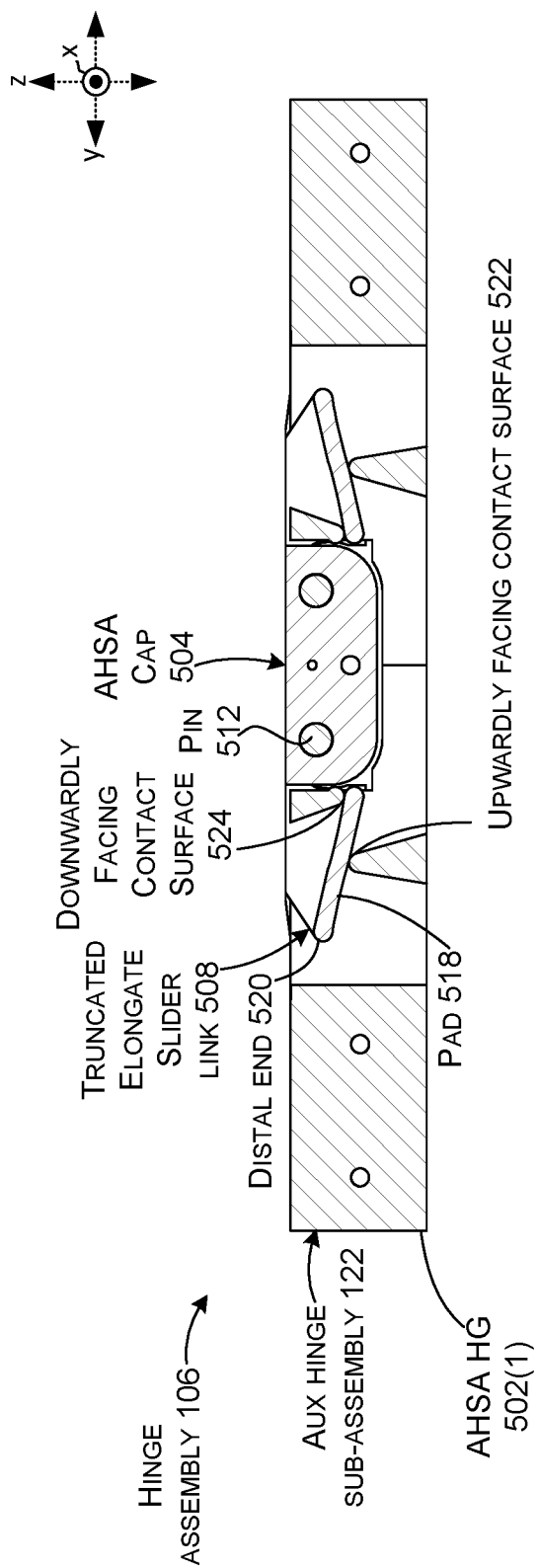
Figure 10A:
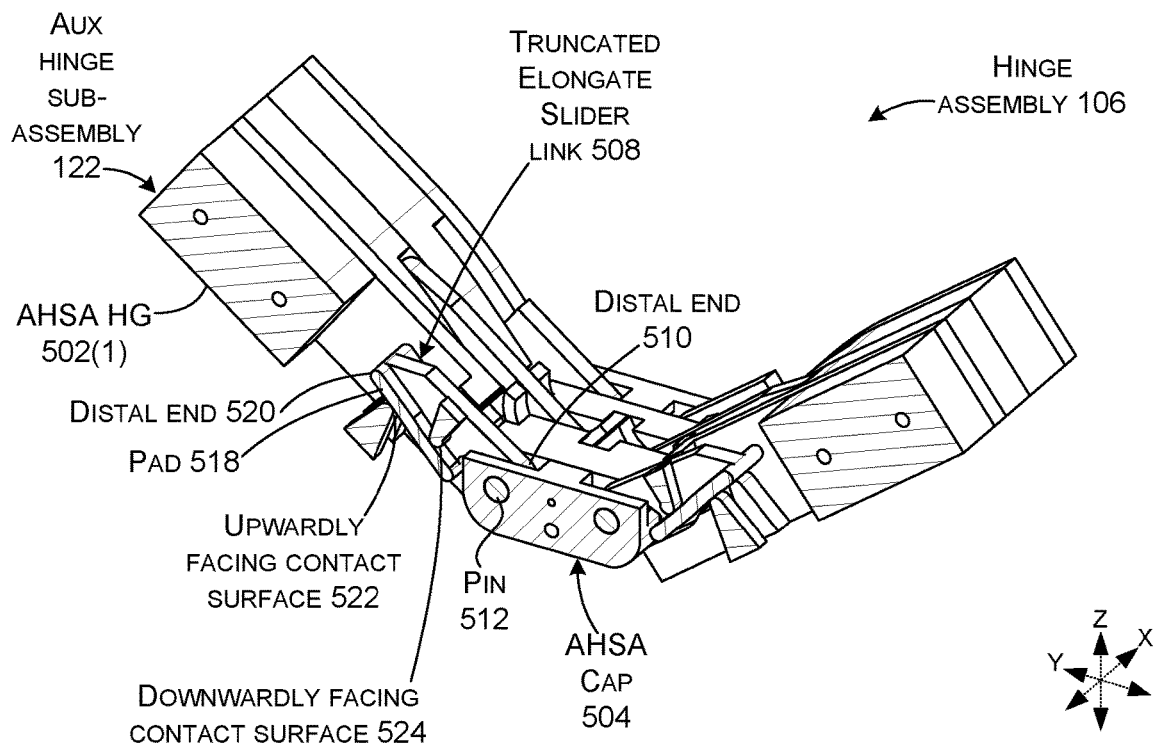
Figure 10B:
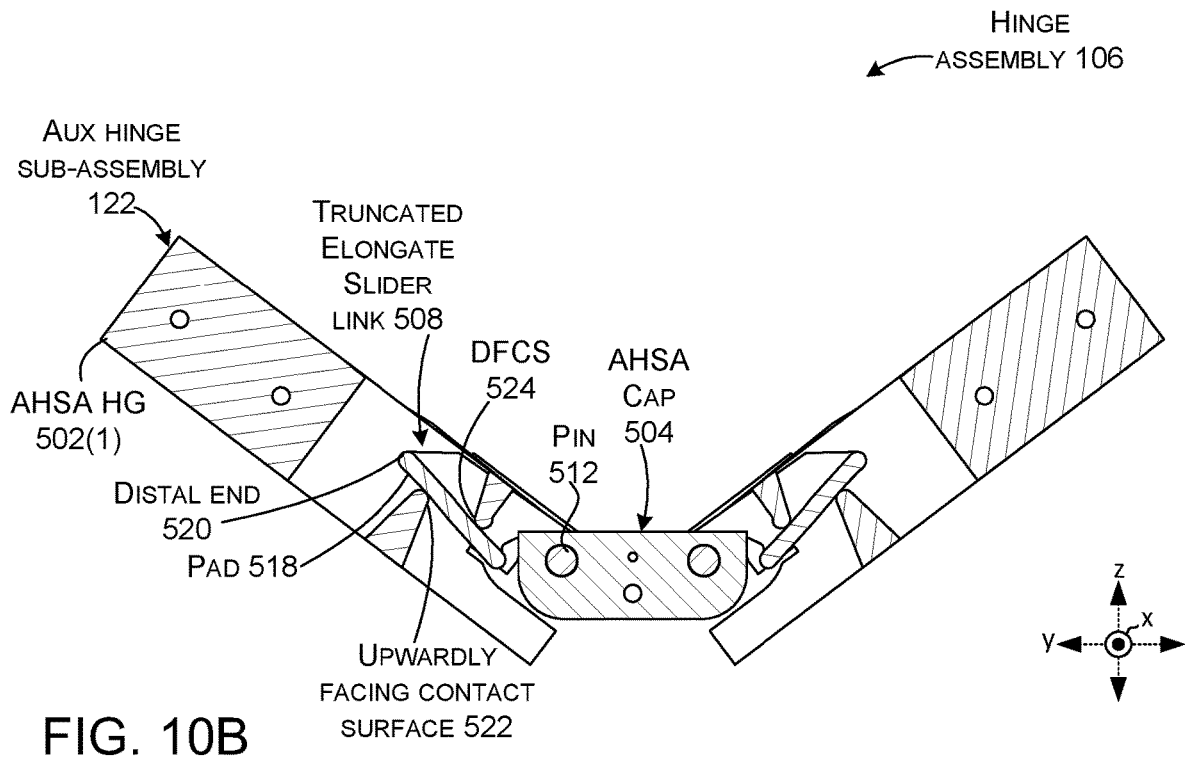
Figure 11A:
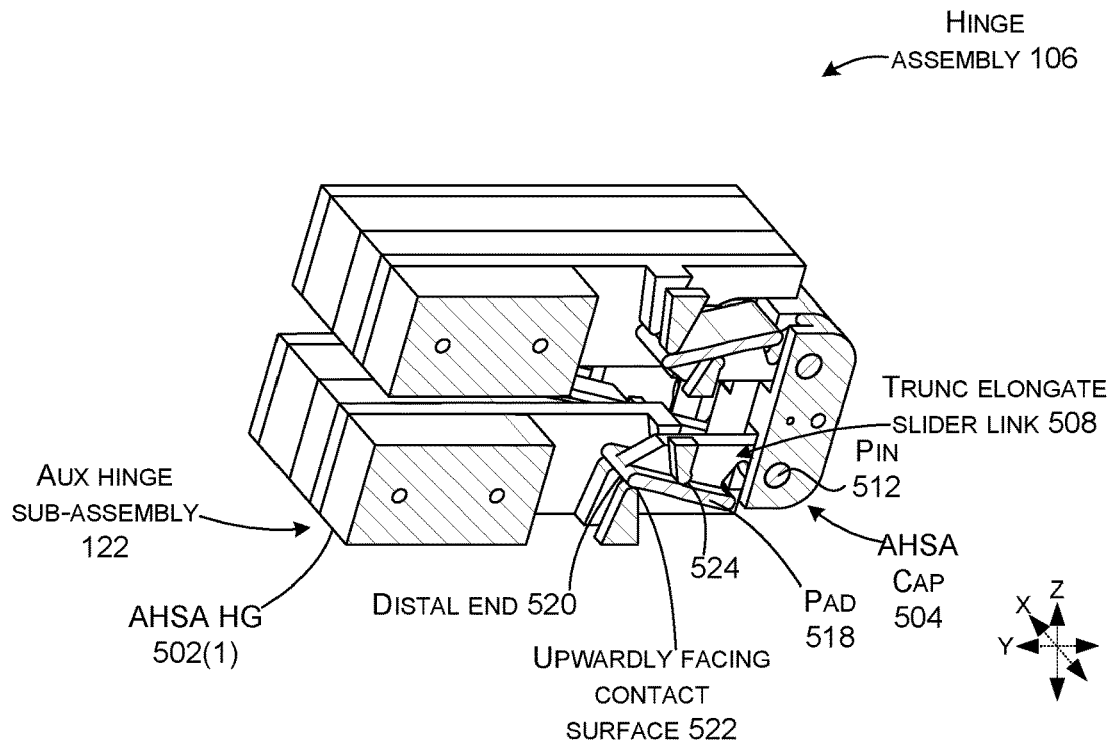
Figure 11B:
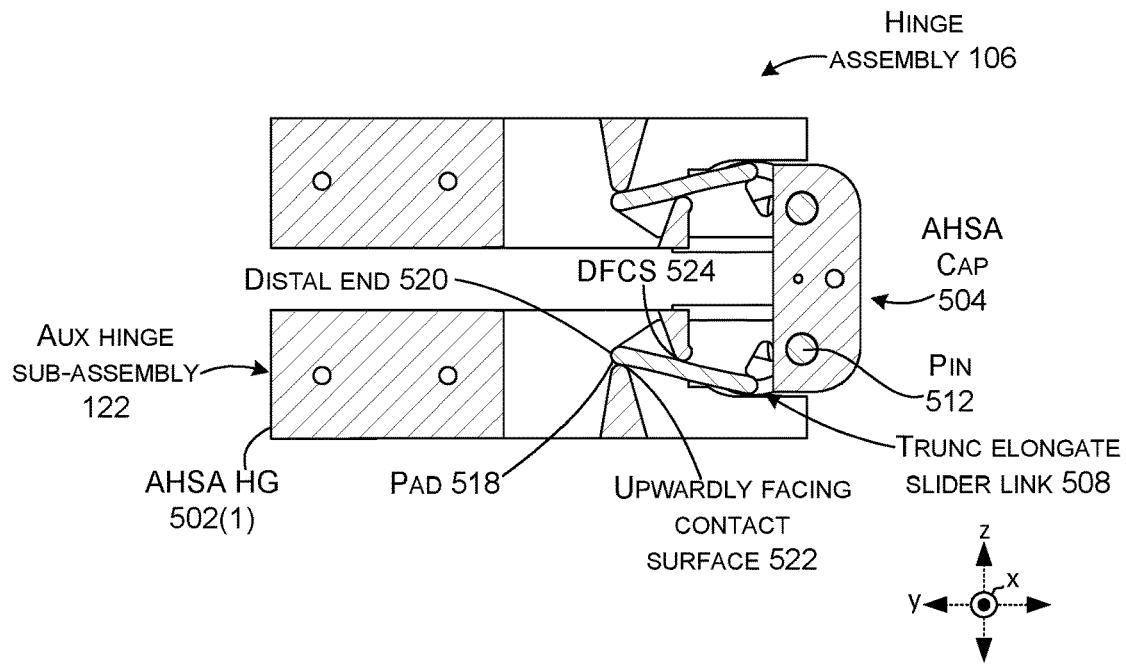

FIG. 9A includes an enlarged balloon view of the truncated elongate slider link 508. Note that the truncated elongate slider 508 extends at an acute angle α from major surface 114. As introduced above relative to FIG. 2A, the acute angle of the truncated elongate slider 508 provides a technical solution by making volume 208 available for other uses, such as positioning other components. In FIG. 2A, the volume 208 extends distally from the upwardly facing contact surfaces 522. Note however as shown in FIG. 9A, the volume 208 could extend between the upwardly facing contact surfaces 522 and/or on the proximal side of the upwardly facing contact surfaces 522 as indicated at 902.

As mentioned above relative to FIGS. 5A-7B, truncated elongate slider link 508 has a proximal end 510 that rotates around a rotational axis that is different (but substantially parallel to) the rotational axis of the hinge sub-assembly's slider link 530. Yet, the present technical solution avoids binding during rotation. This technical solution avoids binding because of the shape of the pads 518 of the truncated elongate slider link 508 and because the truncated elongate slider link 508 has two points of contact beyond the rotational axis of the pins 512. The pads 518 are slightly arcuate (e.g., banana shaped) when viewed in the yz reference plane. The two points of contact are the upwardly and downwardly facing contact surfaces 522 and 524. As opposed to constrained (e.g., sliding movement in a linear direction) the upper and lower contact surfaces engage the truncated elongate slider's pads 518 to guide the truncated elongate slider's movement, but allow movement in the yz reference plane during the rotation. This planar movement can be described as curvilinear within the plane rather than being constrained to a straight line. This configuration can allow the hinge assembly to properly support the flexible display in the fully open position and to allow room for the flexible display to bend without crimping (e.g., tear drop shape) in the closed orientation. The configuration provides a technical solution that resists deformation (e.g., bowing) while reducing real-estate occupied by the hinge assembly 106.

Many foldable devices are heavily constrained by component packaging. It is often important for the hinge assembly 106 to allow device components to encroach on some of the hinge assembly's rectilinear space. However, this encroachment can compromise the structure of the hinge assembly, and may lead to issues such as bulging, lack of detent torque, and/or others. The present concepts solve these technical problems.

The truncated slider link 508 provides a technical solution which allows employing the auxiliary hinge sub-assembly 122 that resists bulging forces and some torques while still allowing some encroachment by non-hinge components. The auxiliary hinge sub-assemblies can provide detent torque to be exerted in the open position. The auxiliary hinge sub-assembly can prevent or resist bulging when the device is closed. The angled orientation of the truncated slider link 508 can allow encroachment by device components such as boards or electrical connectors. This can be accomplished without causing binding (with the hinge sub-assembly) during rotation of the first and second portions.

Individual elements of the devices 100 and the hinge assemblies 106 can be made from various materials, such as metals, plastics, foams, polymers, and/or composites. These materials can be prepared in various ways, such as in the form of sheet metals, die cast metals, machined metals, metal injection moldings, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to, notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1A-11B.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a hinge assembly securing a first portion and a second portion through a range of angular orientations, a flexible display extends over a major surface of the first portion across the hinge assembly and over a major surface of the second portion, and the hinge assembly comprising a pair of hinge sub-assemblies that include elongate slider links that extend along a length from proximal ends that are rotationally secured to the hinge assembly to distal ends that are slideably secured to the first portion, and the hinge assembly further comprising an auxiliary hinge sub-assembly interposed between the pair of hinge sub-assemblies and comprising a truncated elongate slider link that extends along a length that is less than the length of the elongate slider links and extends from a proximal end that is rotationally secured to the hinge assembly to a distal end that is slideably secured in the first portion by only two points of contact with the first portion.

Another example can include any of the above and/or below examples where the elongate slider links are configured to rotate around a rotational axis in the hinge assembly and the truncated elongate slider link is configured to rotate around a different rotational axis that is substantially parallel to but not coextensive with the rotational axis.

Another example can include any of the above and/or below examples where a majority of the length of the elongate slider links is substantially parallel to the major surface of the first portion and wherein a majority of the length of the truncated slider link is neither parallel nor perpendicular to the major surface of the first portion.

Another example can include any of the above and/or below examples where the first portion defines another major surface that is substantially parallel to the major surface, and wherein the truncated slider link extends from the another major surface toward the major surface at an acute angle.

Another example can include any of the above and/or below examples where the device further comprises electronic components positioned in a volume between the truncated slider link and the another major surface.

Another example can include any of the above and/or below examples where the auxiliary hinge sub-assembly comprises multiple auxiliary hinge sub-assemblies interposed between the pair of hinge sub-assemblies.

Another example can include any of the above and/or below examples where the auxiliary hinge sub-assembly is configured to contribute to maintaining a linear configuration of the first portion along an axis extending between the pair of hinge sub assemblies.

Another example can include any of the above and/or below examples where the auxiliary hinge sub-assembly is configured to contribute rotational torque to maintain the first and second portions at a 180-degree orientation of the range of orientations.

Another example can include any of the above and/or below examples where the distal end of the truncated elongate slider link follows a non-linear path during the range of angular orientations.

Another example can include any of the above and/or below examples where the hinge assembly defines upper and lower contacts that define the non-linear path of the distal end of the truncated elongate slider link.

Another example can include any of the above and/or below examples where the non-linear path is never parallel to the major surfaces.

Another example can include any of the above and/or below examples where the pair of hinge sub-assemblies are positioned at opposing ends of the hinge assembly and the auxiliary hinge sub-assembly is interposed between the pair of hinge sub-assemblies and occupies less volume in the first portion than an individual hinge sub-assembly while reducing bowing deformation of the first portion in a closed orientation of the range of orientations.

Another example includes a device comprising a hinge assembly securing a first portion and a second portion through a range of angular orientations, a flexible display extending over a major surface of the first portion across the hinge assembly and over a major surface of the second portion, and the hinge assembly comprising an elongate slider link configured to rotate around a proximal end positioned in the hinge assembly and comprises a distal end that is slideably secured in the first portion and configured to travel along a linear path defined by the first portion during the range of orientations, and a truncated elongate slider link configured to rotate around a proximal end positioned in the hinge assembly eccentrically to the proximal end of the elongate slider link and a distal end that is slideably secured in the first portion and configured to travel along a non-linear path defined by the first portion during the range of orientations.

Another example can include any of the above and/or below examples where the first portion further defines an upwardly facing contact surface and a downwardly facing contact surface and wherein engagement between the truncated elongate slider and the upwardly facing contact surface and the downwardly facing contact surface defines the non-linear path.

Another example can include any of the above and/or below examples where a mid-frame of the first portion defines the upwardly facing contact surface and the downwardly facing contact surface.

Another example can include any of the above and/or below examples where the truncated elongate slider comprises an inverted T shape that includes a generally vertically oriented component positioned above a generally horizontally oriented component when viewed transverse a long axis of the truncated elongate slider.

Another example can include any of the above and/or below examples where the upwardly facing contact surface is configured to contact a downwardly facing contact surface of the generally horizontally oriented component and the downwardly facing contact surface is configured to contact an upwardly facing contact surface of the generally horizontally oriented component.

Another example can include any of the above and/or below examples where the distal end of the truncated elongate slider is positioned in a thickness between the major surface the first portion and a lower major surface of the first portion and wherein the distal end of the truncated elongate slider does not contact the lower major surface of the first portion during the range of orientations.

Another example can include any of the above and/or below examples where the device further comprises electronic components positioned in a volume between the distal end of the truncated elongate slider and the lower major surface of the first portion.

Another example includes a device comprising a hinge assembly securing a first portion and a second portion through a range of angular orientations from a closed orientation to a fully open orientation, a flexible display extending over a major surface of the first portion across the hinge assembly and over a major surface of the second portion, and the hinge assembly comprising first and second hinge sub-assemblies positioned at opposing ends of the first and second portions to rotationally secure the hinge ends of first and second portions through the range of orientations, and the hinge assembly further comprising an auxiliary hinge sub-assembly interposed between the first and second hinge sub-assemblies and configured to reduce deformation of the hinge ends between the first and second hinge sub-assemblies when the first and second portions are rotated to the closed orientation.

Another example can include any of the above and/or below examples where the deformation is caused at least in part by the flexible display pushing outwardly on the hinge assembly in the closed orientation.

Another example includes a device comprising a hinge assembly securing a first portion and a second portion through a range of angular orientations from a closed orientation to a fully open orientation, a flexible display extending over a major surface of the first portion across the hinge assembly and over a major surface of the second portion, and the hinge assembly comprising a hinge sub-assembly to rotationally secure the hinge ends of first and second portions through the range of orientations, and the hinge assembly further comprising an auxiliary hinge sub-assembly configured to reduce deformation of the hinge ends when the first and second portions are rotated to the closed orientation.

The invention claimed is:

1. A device, comprising:
   a hinge assembly securing a first portion and a second portion through a range of angular orientations; and,
   a flexible display extending over a major surface of the first portion across the hinge assembly and over a major surface of the second portion; and,
   the hinge assembly comprising a pair of hinge sub-assemblies that include elongate slider links that extend along a length from proximal ends that are rotationally secured to the hinge assembly to distal ends that are slideably secured relative to the first portion and a majority of the length of the elongate slider links is substantially parallel to the major surface of the first portion, and the hinge assembly further comprising an auxiliary hinge sub-assembly interposed between the pair of hinge sub-assemblies and comprising a truncated elongate slider link that extends along a length that is less than the length of the elongate slider links and extends from a proximal end that is rotationally secured to the hinge assembly to a distal end that is slideably secured relative to the first portion by only two points of contact and a majority of the length of the truncated elongate slider link is neither parallel nor perpendicular to the major surface of the first portion at a closed angular orientation.

2. The device of claim 1, wherein the elongate slider links are configured to rotate around a rotational axis in the hinge assembly and the truncated elongate slider link is configured to rotate around a different rotational axis that is substantially parallel to but not coextensive with the rotational axis.

3. The device of claim 2, wherein the truncated elongate slider link has an inverted T shape when viewed transverse to a long axis extending from the proximal end to the distal end of the truncated elongate slider link.

4. The device of claim 3, wherein the first portion defines another major surface that is substantially parallel to the major surface, and wherein the truncated elongate slider link extends from the another major surface toward the major surface at an acute angle.

5. The device of claim 4, further comprising electronic components positioned in a volume between the truncated elongate slider link and the another major surface.

6. The device of claim 1, wherein the auxiliary hinge sub-assembly comprises multiple auxiliary hinge sub-assemblies interposed between the pair of hinge sub-assemblies.

7. The device of claim 1, wherein the auxiliary hinge sub-assembly is configured to contribute to maintaining a linear configuration of the first portion along an axis extending between the pair of hinge sub-assemblies.

8. The device of claim 1, wherein the auxiliary hinge sub-assembly is configured to contribute rotational torque to maintain the first and second portions at a 180-degree orientation of the range of orientations.

9. The device of claim 1, wherein the distal end of the truncated elongate slider link follows a non-linear path during the range of angular orientations.

10. The device of claim 9, wherein the hinge assembly defines the two points of contact as upper and lower contacts that define the non-linear path of the distal end of the truncated elongate slider link.

11. The device of claim 10, wherein the non-linear path is never parallel to the major surfaces at any orientations of the range of angular orientations of the first and second portions.

12. The device of claim 1, wherein the auxiliary hinge sub-assembly occupies less volume in the first portion than an individual hinge sub-assembly while reducing bowing deformation of the first portion in a closed orientation of the range of orientations.

13. A device, comprising:
a hinge assembly securing a first portion and a second portion through a range of angular orientations; and,
a flexible display extending over a major surface of the first portion across the hinge assembly and over a major surface of the second portion; and,
the hinge assembly comprising an elongate slider link configured to rotate around a proximal end positioned in the hinge assembly and comprises a distal end that is slideably secured relative to the first portion and configured to travel along a linear path defined within the first portion during the range of orientations, and a truncated elongate slider link configured to rotate around a proximal end positioned in the hinge assembly eccentrically to the proximal end of the elongate slider link and a distal end that comprises contact surfaces that form an acute angle relative to the major surface of the first portion, and the distal end is slideably secured relative to the first portion and configured to travel along a non-linear path relative to the first portion during the range of orientations.

14. The device of claim 13, wherein the hinge assembly further comprising an auxiliary hinge sub-assembly hinge guide that extends from the hinge assembly into the first portion and that defines an upwardly facing contact surface and a downwardly facing contact surface and wherein engagement between contact surfaces of the truncated elongate slider link and the upwardly facing contact surface and the downwardly facing contact surface defines the non-linear path.

15. The device of claim 14, wherein the auxiliary hinge sub-assembly hinge guide is secured relative to a mid-frame of the first portion.

16. The device of claim 15, wherein the truncated elongate slider link comprises an inverted T shape that includes a generally vertically oriented component positioned above a generally horizontally oriented component when viewed transverse to a long axis of the truncated elongate slider link, and wherein the generally horizontally oriented component defines the contact surfaces of the truncated elongate slider link.

17. The device of claim 16, wherein the contact surfaces of the truncated elongate slider link comprise a generally upwardly facing contact surface and a generally downwardly facing contact surface, and wherein the upwardly facing contact surface of the truncated elongate slider link is configured to contact the downwardly facing contact surface of the auxiliary hinge sub-assembly hinge guide and the downwardly facing contact surface of the truncated elongate slider link is configured to contact the upwardly facing contact surface of the auxiliary hinge sub-assembly hinge guide.

18. The device of claim 16, wherein the distal end of the truncated elongate slider link is positioned in a thickness between the major surface of the first portion and a lower major surface of the first portion and wherein the distal end of the truncated elongate slider link does not contact the lower major surface of the first portion during the range of orientations.

19. The device of claim 18, further comprising electronic components positioned in a volume between the distal end of the truncated elongate slider link and the lower major surface of the first portion.

20. A device, comprising:
a hinge assembly securing a first portion and a second portion through a range of angular orientations from a closed orientation to a fully open orientation; and,
a flexible display extending over a major surface of the first portion across the hinge assembly and over a major surface of the second portion; and,
the hinge assembly comprising first and second hinge sub-assemblies positioned at opposing ends of the first and second portions to rotationally secure hinge ends of the first and second portions through the range of orientations, and the hinge assembly further comprising an auxiliary hinge sub-assembly interposed between the first and second hinge sub-assemblies and comprising a truncated elongate slider link having a contact pad that is neither parallel nor perpendicular to the major surface of the first portion the auxiliary hinge sub-assembly configured to reduce deformation of the hinge ends between the first and second hinge sub-assemblies when the first and second portions are rotated to the closed orientation.

* * * * *